United States Patent Office 3,551,538
Patented Dec. 29, 1970

3,551,538
METHOD OF PRODUCING PAPERLIKE THERMO-PLASTIC FILM FOR GRAPHIC ART USE
Sadao Yamamoto, Kyoto, and Minoru Okubo, Seiichiro Honda, and Kenji Ogura, Ibaraki-shi, Japan, assignors to Sekisui Kagaku Kogyo Kabushiki Kaisha
Filed Oct. 17, 1966, Ser. No. 586,986
Claims priority, application Japan, Oct. 20, 1965, 40/64,578; Feb. 2, 1966, 41/6,317; May 18, 1966, 41/31,947; June 28, 1966, 41/42,582
Int. Cl. B29d 7/04, 7/14, 27/00
U.S. Cl. 264—49
14 Claims

ABSTRACT OF THE DISCLOSURE

Method of producing paper-like thermoplastic film suitable for use in graphic arts which comprises mixing and kneading thermoplastic resin and polyethylene oxide of a meander type, forming the mixture into film, contacting it with water to elute a part of the polyethylene oxide, optionally impregnating the film with a foaming agent before or after said elution, and providing the film surface with a fine roughness by heating the film to decompose the foaming agent, or by contacting the polyethylene oxide-eluted film with a solvent to swell the film and contacting it with a liquid which does not dissolve the film.

---

This invention relates to a method of producing paper-like thermoplastic film suitable for use in graphic arts.

The conventional paper made from pulp is formed of a thin layer of interentangled cellulosic fibers and is produced from such raw materials as wood, pulp, textile fibers, waste materials and waste paper. The drawback of this paper however is its low physical strength when wet, since the presence of the hydroxyl group in the cellulose imparts pronounced wettability to the paper.

Lately, as a paperlike product to be used as substitute for the pulp paper, numerous attempts are being made to produce the so-called synthetic paper.

As methods of producing this type of synthetic paper, the following can be mentioned.

(1) There is a method of obtaining a synthetic paper in which synthetic resin is formed into staples or filaments, following which these are interentangled and formed into a thin layer as in the case of the conventional pulp paper.

The synthetic paper obtained by this method is comparable to the pulp paper in strength, water resistance and writing properties with pencil or pen. This paper is however very expensive owing to the high cost of the raw material from which it is made and in addition because of the complexity of the processing steps involved in that the synthetic resin must be made into staples or filaments and moreover the difficulty of achieving the stable dispersion of the fibers during the web making step on account of the fact that the fibrillation of these fibers is more difficult than in the case of the pulp fibers.

(2) There is a method of obtaining paperlike foamed styrene resin sheets by extruding foamable styrene resins into a thin sheet form.

The synthetic paper obtained by this method has an interior structure which differs from the conventional pulp paper in that its voids are large. And in its manufacture it is difficult to obtain a thickness of he usually used paper. Further, since its surface is covered with a smooth skin, not only is it defective in its ability to fix the usual inks but also it cannot be written with a pencil. For improving on these defects, a proposal has been made of treating the surface of the foamed styrene resin sheets. By this surface treatment the ink-fixing ability has been improved and the writing with a pencil has been made possible, but there are still such defects as the pen or pencil sticking in the paper during writing and the cracking of the surface of the paper during high speed printing operations. These phenomena are difficult of solution so long as the present manufacturing method is followed.

(3) There is a method of obtaining a multicellular surface-roughened film by a method consisting flowing and spreading a solvent-dissolved synthetic resin.

The synthetic paper obtained by this method becomes costly as a result of the difficulties involved in recovering the solvent and in addition the complexity of the manufacturing process. Further, there are such problems as its properties and changes with the passage of time which result from the residual solvent.

(4) There is a method of obtaining a synthetic paper by incorporating an inorganic or organic filler in a synthetic resin and forming this into film form by means of a calender or extruder.

The synthetic paper obtained by this method is no more than a film containing a filler, and hence it does not become a product having properties making it suitable for graphic art purposes. Further, even though the content of the filler is increased, this merely decreases its physical strength but does not improve its inscribability.

(5) There are methods of obtaining synthetic papers by coating the surface of a synthetic resin film with an inorganic or organic filler with the use of a binder or by embedding the same by means of heat and pressure. Alternatively, there are methods of obtaining synthetic papers by roughening the surface of synthetic resin films either by treating the surface chemically with solvents or chemicals or by treating it electrically or mechanically.

Although the surface of the synthetic papers obtained by these methods can be rendered such that it is suitable for graphic art use, the interior of these products do not differ whatsoever from the conventional synthetic resin films. Consequently, they lack the processing properties as paper, i.e., the properties possessed by paper by which it can be used for packaging, be cut, bent and secured, etc.

An object of this invention is to provide a method of producing from thermoplastic resins a thermoplastic film having minute voids in its interior and which has a feel similar to that of paper.

Another object is to provide a method of producing from thermoplastic resins a thermoplastic film which, as in the case with paper, can be cut or bent as well as has the property making it suitable for wrapping purposes.

A further object is to provide a method of producing from thermoplastic resins a thermoplastic film which excels paper in its water resistance and on the other hand is similar to paper in such properties as abrasion resistance, dimensional stability, rigidity and moisture permeability.

A still further object is to provide a method of producing from thermoplastic resins a thermoplastic film having a surface which is very finely rough and hence has a surface similar to paper which has properties making it suitable for use in graphic arts.

An additional object is to provide a method of preparing a thermoplastic film which is not readily charged with static electricity.

Other objects and advantages of this invention will be apparent from the following description.

The foregoing objects are attained by a method which comprises making a film composed of a thermoplastic resin and a water-soluble polymer of ethylene oxide, and preferably polyethylene oxide of a molecular weight of above 100,000, then contacting the film with water to elute into the water a part of the water-soluble polymer of ethylene oxide contained in the film thereby providing minute voids inside the film and at the same time a fine roughness to the surface of the film.

It is also possible according to this invention to make a film composed of a thermoplastic and a water-soluble polymer of ethylene oxide, and then impregnating the film with a foaming agent solution before or after contacting said film with water to elute into the water a part of the water-soluble polymer of ethylene oxide, and thereafter heating the film to decompose the foaming agent which has permeated the film thereby providing the surface with a fine roughness to a still greater extent.

Further, according to this invention, it is also possible to make a film composed of a thermoplastic resin and a water-soluble polymer of ethylene oxide, and then contacting said film with water to elute into the water a part of the water-soluble ethylene oxide, followed by contacting the film with an organic solvent which either dissolves or swells the film to impregnate the film with the organic solvent, thus either dissolving or swelling the surface of the thermoplastic film, and thereafter contacting the film with a liquid which does not dissolve it but which is compatible therewith to extract the organic solvent from within the film, thereby providing the surface with a fine roughness to a still greater degree.

In order to more clearly illustrate the different variations of applicants' process, reference is made to the flow diagrams designated FIGS. 1-6 of the attached drawings. Since these figures are in the nature of flow diagrams, it is deemed they are essentiallly self-explanatory. However, a brief description of the essential features of each of the figures will be discussed below.

To illustrate the nature and quality of paper products produced according to the present invention, reference is made to FIGS. 7-10 of the attached drawings, wherein photographs of the surfaces of films produced by applicants' method are exemplified.

Figure 1:
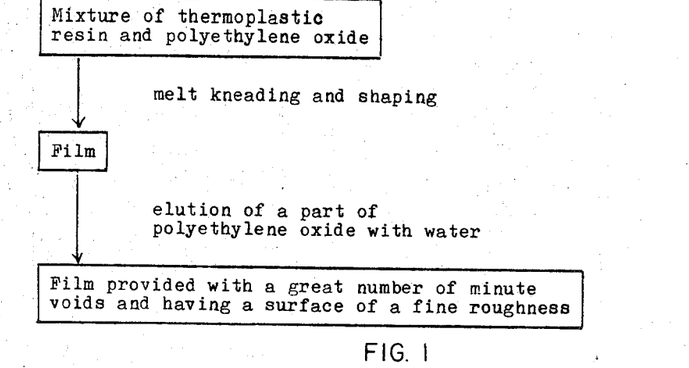
FIG. 1 represents applicants' simplest process and is a method of eluting a part of the meander polyethylene oxide component to obtain a film having minute voids and a fine roughness suitable for printing on the surface thereon.
Figure 2:
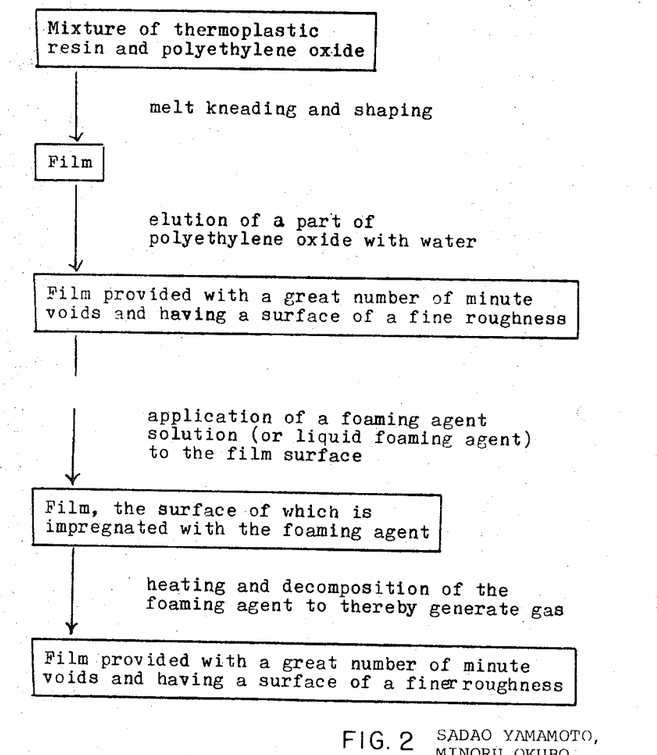
FIG. 2 represents the essential steps of FIG. 1 except for the added steps of applying a foaming agent and heating the impregnated surface of the film to decompose the foaming agent, generate the gas and thereby forming a film having even a finer roughness.
Figure 3:
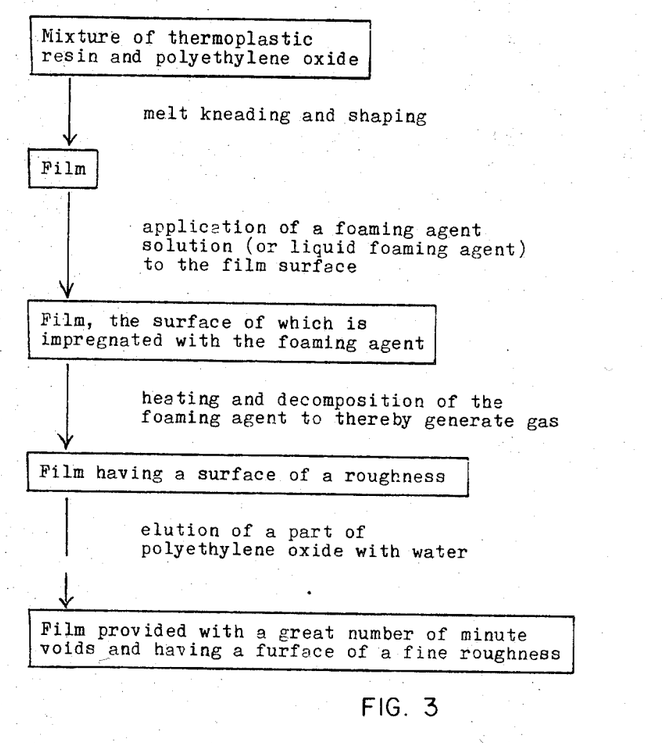
FIG. 3 illustrates a process whereby the foaming agent is first applied to the film and decomposed by heating, and the film is then eluted with water.
Figure 4:
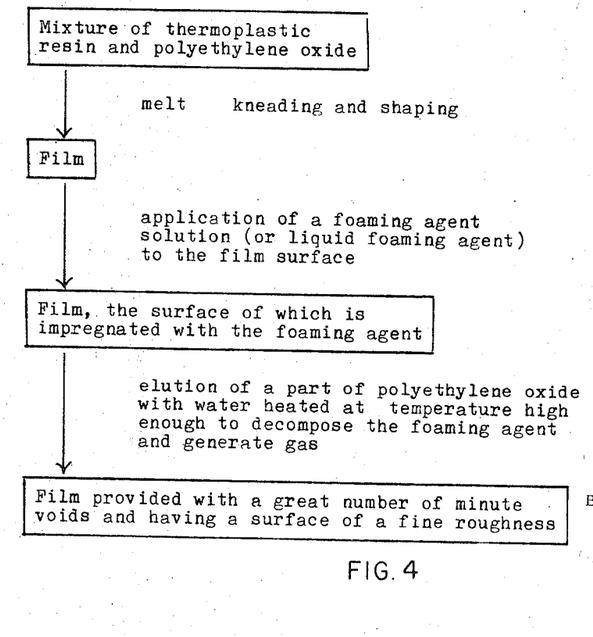
FIG. 4 exemplifies a process whereby the thermoplastic resin and polyethylene oxide surface is first impregnated with a foaming agent and then water is applied to the surface of the film to elute some of the polyethylene oxide therefrom, said water being at temperatures high enough to also decompose the foaming agent.
Figure 5:
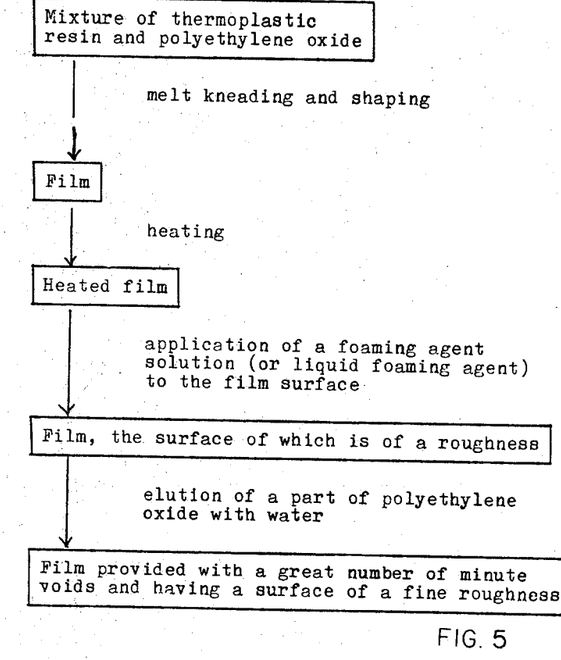
FIG. 5 is a method whereby the thermoplasticpolyethylene oxide mixture is kneaded, formed into film and heated, whereby the surface of the film is then impregnated with a foaming agent and then eluted with water in order to obtain the desired surface.
Figure 6:
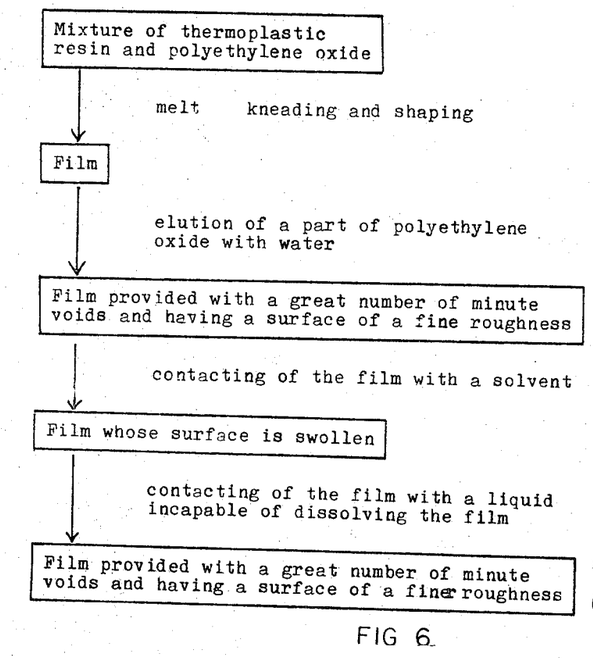
FIG. 6 is a method of eluting the surface of the film with water followed by impregnating the film with a solvent to swell the surface thereof, and finally contacting the film with a liquid incapable of dissolving the film to provide a surface having a fine roughness.
Figure 7:
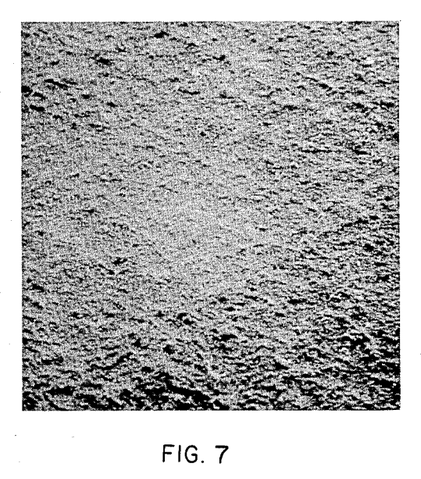
FIG. 7 shows a photograph of the surface of the paper-like film produced according to Example 1 of the present application. This photo is 100 times magnified and illustrates the minute voids and convexities formed by elution of the polyethylene oxide.
Figure 8:
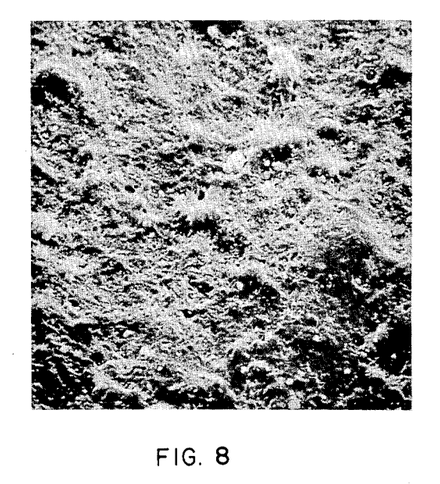
FIG. 8 is 100 times magnified and discloses the surface of the paper-like film obtained in Example 9. Note the voids and linear convexities and concavities present on the film surface. Note also that the filler is observed on the surface.
Figure 9:
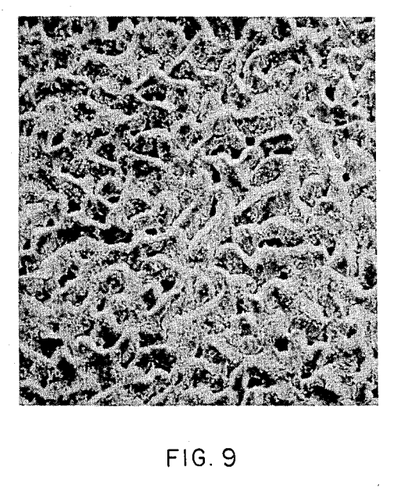
FIG. 9 illustrates the surface of a paper-like film produced according to the present invention and demonstrates the fine voids formed by the elution of the polyethylene oxide and comparatively large voids and convexities formed by the decomposition of the foaming agent.
Figure 10:
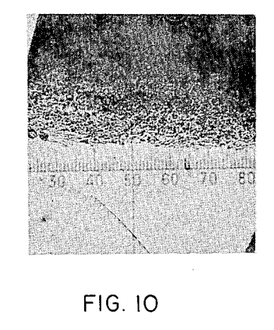
FIG. 10 illustrates a section of the paper-like film obtained in Example 1. Here it can be seen that the minute voids formed by the elution of polyethylene oxide extend to a considerable depth. Note also that the voids extend not only in the vertical direction but in all directions and are entangled with one another.

As the thermoplastic resins to be used in this invention, conveniently usable are the styrene resins, vinyl chloride resins, olefin resins, cellulose acetate resins, acrylic resins, polycarbonates, polyamides, polyacetals, thermoplastic polyesters and polyvinylbutyral. And of these thermoplastic resins, those which can be melt blended can be suitably used in combinations of two or more.

The styrene resins, as herein referred to, include polystyrene, the polymers of styrene derivatives, the copolymers of styrene and the various monomers which can be copolymerized therewith, and the resins consisting of these resins to which the various monomers have been grafted. These resins can be used either alone or as a mixture of two or more thereof. Further, these styrene resins may be optionally incorporated with a vinyl acetate resin, methyl methacrylate resin, polyethylene, polypropylene, ethylene-vinyl acetate copolymer, polyvinyl butyral, phenoxy resin, polybutadiene, acrylonitrile-butadiene copolymer, natural rubber, etc.

As vinyl chloride resins, included are polyvinyl chloride, interior-plasticized vinyl chloride resins (e.g. the copolymer of vinyl and vinyl ester, etc.), chlorinated vinyl chloride resins, vinylchloride-vinylacetate copolymer and vinyl chloride-vinylidene chloride copolymer. These can be used either singly or as a mixture of two or more thereof.

Again, these vinyl chloride resins may, as desired, be incorporated with the acrylonitrile-butadiene copolymer (NBR), the three-component copolymer of acrylonitrile, butadiene and styrene (ABS resin), the three-component of methyl methacrylate, butadiene and styrene, vinylacetate-ethylene copolymer, chlorinated polyethylene, the polymer of chloroprene, etc.

As the olefin resins, included are polyethylene, polypropylene, the polymer of butene-1, the polymer of 4-methylpentene-1, ethylene-propylene copolymer, ethylene-vinyl acetate copolymer and ethylene-vinyl chloride copolymer. These can be used either alone or as a combination of two or more thereof.

Again, these olefin resins may also be suitably incorporated with such as polystyrene, acrylonitrile-styrene copolymer, the three-component copolymer of acrylonitrile, butadiene and styrene, methyl methacrylate resin, cellulose acetate resin, polyacetal, polyamides, polybutadiene and styrene-butadiene rubber.

The acrylic resins include the polymers of acrylic acid esters and methacrylic acid esters.

According to the invention method, it is possible to obtain varied types of paperlike thermoplastic films depending upon the nature of the thermoplastic resin used.

For instance, the paperlike thermoplastic film obtained from the styrene resins excells in surface hardness and is of sufficient stiffness such that it can be used as a substitute for the general newsprint as well as high-grade printing paper. The product obtained from the vinyl chloride resins is pliable and excels in tensile strength and resistance to chemicals, whereas that obtained from polyethylene is stretchable, and since it excells in a tenacity (hard to break when it is crumpled) and tear strength, it is suitable for such as wrapping paper.

On the other hand, the paperlike thermoplastic film obtained from polypropylene, polyamides and polyacetal excells in physical strength, such as tensile and tear strengths, and excels especially in its thermal stability and resistance to chemicals. Consequently, it is suitable for use as a paper for building and interior decoration purposes.

The properties of the thermoplastic film can also be modified by mixing two or more classes of the thermoplastic resins. For instance, when polystyrene is mixed with either a styrene-butadiene copolymer or an acrylonitrile-butadiene copolymer, the thermoplastic film obtained is improved in its pliability as well as break and tear strengths. When either an ethylene-vinyl acetate copolymer, vinyl acetate resin or phenoxy resin is mixed with polystyrene, the pliability and likeness to paper of the resulting film are enhanced. On the other hand, when either methyl methacrylate resin, acrylonitrile-butadiene copolymer or the three-component copolymer of acrylonitrile, butadiene and styrene are mixed with polystyrene, the tensile strength and stretchability are improved. Further, when polystyrene is mixed with polypropylene, the thermoplastic film obtained becomes one having stiffness and a hard feel.

Further, when polypropylene and polyacetal are mixed, a product excellent not only in pliability but possessing toughness as well as heat resistance is obtained. A mixture of polypropylene and an ethylene-vinyl acetate copolymer produces one having superior tensile and tear strength and excellent in heat sealability. One excelling in its heat resistance and suitability for printing is obtained when polypropylene and a polyamide are mixed. Again, when polypropylene is mixed with an acrylonitrile-styrene copolymer, a film which is hard but has flexing strength is obtained. On the other hand, the product obtained from a mixture of polypropylene with the three-component copolymer of acrylonitrile, butadiene and styrene has a hard surface, excells in its heat resistance and resistance to stress cracking and moreover has properties making it suitable for printing.

According to this invention, these thermoplastic resins may, if necessary, be incorporated with such as stabilizers, plasticizers, antioxidants, foaming agents, dyestuffs and pigments, fillers, ultraviolet absorbents, surfactants and antistatic agents.

The addition of especially such inorganic fillers as white carbon, barium sulfate, zinc sulfide, titanium dioxide, zinc oxide, clay, talc, calcium carbonate, magnesium carbonate, powdered mica, gypsum, and lithopone, or the organic fillers such as microcrystalline cellulose, natural fibers and synthetic fibers, which may be suitably added either singly or in a combination, is effective in enhancing the paperlikeness, opacity and surface hardness of the resulting thermoplastic film, as well as in reducing the cost thereof. Although the amount in which these fillers can be added will vary depending upon the class of filler, the amount of the thermoplastic resin used and the use intended for the resulting paperlike thermoplastic film, in the case of polystyrene, polyvinyl chloride and methyl methacrylate resin, an amount on the order of 40 parts by weight per 100 parts by weight of the resin can be added, whereas in the case of polyethylene, polypropylene, polyamides and polyacetal, an amount on the order of up to 60 parts by weight can be added.

Further, the configuration and particle size of the filler added have a bearing on the paperlikeness and strength of the resulting thermoplastic film, those whose configuration is of scale or sheet form having a greater effect in obtaining paperlikeness and those of smaller particle size providing films with greater strength. Further, a greater paperlike effect is obtained by the use of white carbon, clay, powdered mica and gypsum, whereas the addition of zinc sulfide, titanium dioxide and lithopone is effective in obtaining opacity and whiteness.

The term "water-soluble polymers of ethylene oxide," as herein used, refer to the homopolymers of ethylene oxide and the copolymers of ethylene oxide with those monomers which are copolymerizable therewith, and which are water-soluble.

Although as copolymers of ethylene oxide, there are such as the copolymers of ethylene oxide with such monomers as propylene oxide, epoxybutane and styrene oxide; in this invention these copolymers must satisfy the condition that they are water-soluble. Namely, when the amount attached of the foregoing monomeric propylene oxide, epoxybutane and styrene oxide becomes great, they become water-insoluble and hence cannot be used. Sonsequently, the amount of the propylene oxide, epoxybutane and styrene oxide to be copolymerized with the ethylene oxide in this invention must be limited to a range that will not cause the resulting copolymers to become water-insoluble.

The water-soluble polymer of ethylene oxide to be used in this invention is one whose structure is preferably of the meander type instead of the zigzag type. Again, those of high molecular weight are to be preferred over those of low molecular weight. Thus, a water-soluble polymer of ethylene oxide of an average molecular weight of above about 1000 whose melting temperature and melt viscosity approximate those of the thermoplastic resin used are to be preferred. For these reasons, especially suitable are those having a meander type structure and whose average molecular weight is above 100,000.

Further, these water-soluble polymers of ethylene oxide of various molecular weight may be used as a mixture according to this invention.

According to one mode of this invention, the foaming agent to be used for impregnating the film is of the thermally decomposing type of foaming agent which generates a gas by being decomposed by heating. As such a foaming agent, conveniently used are the azo compounds, N-itroso compounds, sulfonyl hydrazide compounds, azide compounds and nitrified urea. Of these compounds, especially suitable include such as azodicarbonamide, azobisisobutyronitrile, diazoaminobenzene, P-P'-oxybisbenzene sulfanylhydrazide, N,N'-dimethyl-N-N'-dinitrosoterephthalamide, dinitrosopentamethylenetetramine, trihydrazine triazine, benzene sulfonylhydrazide, diethylazodicarboxylate, paratoluene sulfonylhydrazide, benzene sulfoazide and paratoluene sulfoazide.

In this invention, these foaming agents are used as solutions. Those which are liquid at room temperature, such as benzene sulfoazide and paratoluene sulfoazide, may be used as such.

Those normally solid foaming agents can be used by first rendering them into liquids by heating and melting them. Again, the foaming agents can be used in solution form by dissolving them in solvents. In those instances where the melting point of the foaming agent is higher than its decomposition point, it must be used dissolved in a solvent. The solvent to be used in this case is suitably chosen in accordance with the class of the foaming agent and class of the thermoplastic resin used.

Examples of solvents suitable for this purpose are shown in Table I, below.

TABLE I

| Foaming agent: | Solvent |
| --- | --- |
| Azobisisobutyronitrile | Methanol, ethanol, ketone, ether. |
| Azodicarbonamide | Hot water, dimethylformamide. |
| Diazoaminobenzene | Methanol, ethanol, benzene, chloroform, ether. |
| Benzene sulfonylhydrazide | Ethanol, ethylene glycol. |
| Paratoluene sulfonylhydrazide | Methanol, ethanol, methyl ethyl ketone, dichloro-ethane, xylene. |

TABLE I.—Continued

Foaming agent: Solvent
   Paratoluene sulfoazide --- Methanol, methyl ethyl ketone, acetone.
   Benzene sulfoazide ------ Alcohol, ketone, benzene.
   Diethylazodicarboxylate -- Alcohol, ketone.

According to this invention, the thermoplastic film is impregnated with the aforesaid foaming agent. Thus, if the foaming is one which either dissolves or swells the thermoplastic film. It can be used as such. However, in those cases where the foaming agent does not possess a permeability to the thermoplastic film, the foaming agent may be used in solution form by dissolving it in a solvent in which it is soluble and which at the same time either dissolves or swells the thermoplastic film.

Further, a solvent such as this serves effectively also as a diluent of the foaming agent as well as a regulator of the amount impregnated and speed of permeation of the foaming agent into the thermoplastic resin film. Hence, the amount impregnated and speed of penetration of the foaming agent into the thermoplastic film can also be regulated by mixing in part in the aforesaid solvent a nonsolvent of the thermoplastic resin.

Table II illustrates examples of such suitable combinations of the foaming agent, solvent and diluent.

water-soluble polymer of ethylene oxide together and then forming the film by means of an extruder or calender. The method used in mixing and kneading the thermoplastic resin and water-soluble polymer of ethylene oxide together is not specified in particular and is suitably selected according to what method is subsequently employed for forming the film, but generally the method of mixing and kneading with heated rolls such as mixing rolls can be conveniently employed for this purpose.

However, in those cases where the molecular weight of the water-soluble polymer of ethylene oxide is small and its melting point and melt viscosity differs markedly from those of the thermoplastic resin used, the mixing and kneading in of the former into the latter would be difficult by the method which uses heated rolls. In this case, the use of a mixer such as a Banbury mixer is recommended.

Further, when the film is formed by an extruder which excels in its ability to accomplish the mixing and kneading of the components, it is also possible to omit the operation of mixing and kneading the thermoplastic resin and the water-soluble polymer of ethylene oxide in advance and to carry out the necessary mixing and kneading of the components in the barrel of the extruder to be then extruded therefrom through a die into film form.

In mixing and kneading the thermoplastic resin and water-soluble polymer of ethylene oxide together, such

TABLE II

| Resin | Foaming agent | Solvent | Diluent |
| --- | --- | --- | --- |
| Styrene resins | Paratoluene sulfoazide | Not needed | Methanol. |
|  | Benzene sulfoazide | do | Do. |
|  | Azobisisobutyronitrile | Methyl ethylketone, acetone | Do. |
| Vinyl chloride resins | Paratoluene sulfonylazide | Tetrahydrofuran, acetone | Methanol. |
|  | Diethylazodicarboxylate | Tetrahydrofuran, acetone | Do. |
|  | Azodicarbonamide | Dimethylformamide | Hot water. |
| Polymethylmethacrylate | Paratoluene sulfoazide | Acetone | Methanol. |
| Polyethylene | do | Xylene | Do. |
| Polypropylene | Dinitrosopentamethylenetetramine | Toluene | Do. |
| Polycarbonates | Paratoluene sulfonylazide | Dichloroethane | Methanol, acetone. |
| Polyamides | Paratoluene sulfoazide | Methanol, formic acid | Not needed. |
| Polyacetal | Benzene sulfoazide | Hot m-cresol | Methanol. |

The organic solvent to be used in this invention for dissolving or swelling the film can be suitably chosen and used according to the class of the thermoplastic resin used in forming the film.

Suitable examples of such organic solvents which dissolve or swell the film are shown in Table III, below.

TABLE III

Foaming agent: Solvent
  Vinyl chloride
    resins --------- Tetrahydrofuran, acetone, dimethylformamide, cyclohexane.
  Styrene resins ----- Methyl ethyl ketone, benzene, toluene, dimethylformamide, dioxane acetone, trichloroethylene, butyl acetate.
  Polymethyl
    methacrylate --- Methyl ethyl ketone, formic acid, acetone, chloroform, benzene, ethylene chloride.
  Polyethylene ------ Xylene, toluene, formic acid.
  Polypropylene ---- Toluene, decane.
  Polycarbonates --- Methylene chloride, m-cresol.
  Polyesters ------- Mixture of phenol and tetrachloroethane.
  Polyamides ------ Carbolic acid, cresol, formic acid, hot acetic acid, alcohol.

Next, the several operations of this invention will be described.

First, according to this invention, a film composed of a thermoplastic resin and a water-soluble polymer of ethylene oxide is made. Although there are many methods of making this film, the most common method consists of mixing and kneading the thermoplastic resin and the additives as plasticizers, stabilizers, antioxidants, foaming agents, ultraviolet absorbents, antistataic agents, lubricants, fluorescent brightening agents and, in addition, dyestucs and pigments can be suitably mixed in.

The amount in which the water-soluble polymer of ethylene oxide is mixed with the thermoplastic resin is suitably chosen in accordance with the class of the thermoplastic resin used, the molecular weight of the water-soluble polymer of ethylene oxide, the compatibility of the thermoplastic resin and the water-soluble polymer, the properties desired in the intended thermoplastic film and uses to which it is to be applied, etc., but generally 0.1–50 parts by weight of the water-soluble polymeric ethylene oxide per 100 parts of the thermoplastic resin are conveniently used. When the amount mixed of the former is insufficient, there generally remains in the resulting thermoplastic film a feel that is characteristic of the original thermoplastic film and a paperlike feel is reduced. On the other hand, when the amount of the former is excessive, the strength of the resulting thermoplastic film is reduced.

Thus, it is possible to obtain, as desired, paperlike thermoplastic films ranging from those similar to art paper in which the size of voids is small to those similar to newsprint in which the voids are large by varying the amount mixed of the polymeric ethylene oxide in the thermoplastic resin. However, when the amount mixed of the former exceeds the limit of compatibility relative to the latter, there takes place a separation and aggregation phenomenon between the two components and a homogeneous resin composition cannot be obtained, and in consequence a satisfactory thermoplastic film having minute voids uniformly dispersed in its interior and whose surface has a fine roughness does not result. Hence, the amount mixed of the water-soluble polymer of ethylene oxide must be limited to such an amount as will not set up this separation and aggregation phenomenon between the two components.

In mixing and kneading together the thermoplastic resin and the water-soluble polymer of ethylene oxide, when the resin is one which demonstrate relatively good compatibility with the water-soluble polymer of ethylene oxide, such as styrene resins, vinyl chloride resins, cellulose acetate resin, acrylic resin, polyamides and polyacetal, the two components can be directly mixed and kneaded together. However, when the thermoplastic resin is one whose compatibility with the water-soluble polymer of ethylene oxide is not too good, such as olefin resins, polycarbonates and thermoplastic polyesters, one or more classes of other thermoplastic resins which are compatible with the foregoing two components can be added as a mediating resin, following which the three or more components are mixed and kneaded together.

The mediating resin may be added in an amount of less than 40 parts by weight per 100 parts by weight of the aforesaid thermoplastic resin. And, for example, where the thermoplastic resin used is polyethylene or polypropylene, the mediating resin which may be conveniently used include such as the styrene resins, acrylonitrile-styrene copolymer, ethylene-vinyl acetate copolymer, styrene-butadiene copolymer, polybutadiene, polyacetal and polyamides.

Next, the resinous compound consisting of the mixed and kneaded thermoplastic resin and water-soluble polymer of ethylene oxide is formed into a film. For this film formation, the commonly employed techniques for forming thermoplastic resin films can be conveniently used such, for example, as the extrusion molding by means of the T-die method, extrusion molding by the inflation method, and molding by the calender method. The film formed by these methods may be stretched either mono-axially or biaxially, as required.

The temperature at which the film is formed will vary depending upon such as the class of the thermoplastic resin used, the class and amount of the water-soluble polymer of ethylene oxide used, and the molding method. When this temperature is too high however, a separation of the thermoplastic resin and the water-soluble polymer of ethylene oxide tends to take place. Hence, it is to be preferred that the molding temperature be selected to ensure that the dispersion of the water-soluble polymer of ethylene oxide in the film is such that it is in a continuous netlike state.

When the thermoplastic resin and water-soluble polymer of ethylene oxide is to be formed directly into a foamed film, this may be accomplished by introducing under pressure either a normally gaseous or a readily volatilizable liquid organic substance, into the mixture of the thermoplastic resin and the water-soluble polymer of ethylene oxide, or a thermoplastic resin which has been impregnated in advance with either a normally gaseous or a readily volatilizable liquid organic substance may be mixed and kneaded together with a water-soluble polymer of ethylene oxide in an extruder from which the mixture is extruded in film form to yield a foamed film.

Needless to say, the thermally decomposing type of foaming agent may also be mixed and kneaded with the thermoplastic resin and water-soluble polymer of ethylene oxide in an extruder and extruded therefrom to form a foamed film.

Next, the film formed as described above is contacted with water and the water-soluble polymer of ethylene oxide is eluted from the film. This elution is best carried out by soaking the film in water. It is possible however to employ such procedures as pouring water onto the film on contacting the film with steam, as desired. And when soaking the film in water, the elution speed of the water-soluble polymer of ethylene oxide contained in the film can be enhanced by either causing the water to flow, contacting the film and water countercurrently or imparting an ultrasonic vibration to the water.

The elution of the water-soluble polymer of ethylene oxide can also be facilitated by uniformalizing the wetness of the film surface by adding such as alcohol, ethylene glycol or a surfactant to the water. The use of a surfactant or the like in an unnecessarily large amount reduces the elution rate however, and hence it is necessary that the amount added be properly chosen. The temperature at which the film is brought into contact with the water is not critical, it being permissible to contact the film with cold water, but a higher temperature is preferred as it will accelerate the elution of the water-soluble polymer of ethylene oxide into the water. Especially, in the case of a film obtained by employment of a large blow up ratio in its extrusion molding by the inflation method, the elution of the water-soluble polymer of ethylene oxide from this film is rapidly carried out if it is soaked in water of high temperature in a state in which its four sides are secured. In addition, its elution rate can also be increased.

Further, when the elution is to be carried out at above 100° C., steam or an azeotropic liquid of water and ethylene glycol can be used. In this case however, to preclude the deformation and shrinkage of the film, its four sides should be secured.

Again, by the use of a proper temperature for the water it is also possible to anneal the film and hence eliminate the strains that have been set up in the film during its molding operation.

If, in this invention, the film is mono- or biaxially stretched while contacting it with water, the stretching of the film and elution of the water-soluble polymer of ethylene oxide from the film can be accomplished at the same time.

The water-soluble polymer of ethylene oxide contained in the film cannot possibly be completely eluted into the water, nor is it necessary in this invention. In the case the amount eluted into the water of the water-soluble polymer of ethylene oxide is insufficient in this invention, minute voids are not sufficiently formed in the film, and hence the resulting film does not possess a satisfactory paperlike feel. In addition, it becomes the cause of the water-soluble polymer of ethylene oxide contained in the film to exude to the surface of the film subsequently, and thus is undesirable.

On the other hand, if a part of the water-soluble polymer of ethylene oxide is left in the film, the hydrophilic property of the film is enhanced and in addition there is provided an antistatic effect.

According to this invention, when the film composed of a thermoplastic resin and a water-soluble polymer of ethylene oxide is contacted with water, the polymeric ethylene oxide elutes very rapidly into the water. The fact that this elution speed is great is of great advantage from the commercial standpoint.

The speed and rate of elution of the water-soluble polymer of ethylene oxide will vary depending upon the class of the water-soluble polymer of ethylene oxide that is used. Of these polymers, polyethylene oxide of the meander type of the following formula is especially suitable in view of its speed and rate of elution.

Further, the elution rate of the ethylene oxide also varies depending upon the class of the thermoplastic resin that is used. For instance, in the case of polystyrene, methyl methacrylate resin and polyvinyl chloride, the rate of elution of the water-soluble polymer of ethylene oxide is great, whereas in the case of polyethylene, polypropylene, polyamides and polyacetal, the rate is somewhat inferior.

For enhancing the rate of elution of the water-soluble polymer of ethylene oxide, the addition of a filler to the thermoplastic resin is effective.

When the water-soluble polymer of ethylene oxide contained in the film is eluted into water in this invention, the film turns white and opaque, and homogeneous minute voids are formed on the surface as well as interior of the film. Thus, with the surface of the film being roughened, a thermoplastic film which is very paperlike is obtained.

Further, according to this invention, the film may be impregnated with the previously described foaming agent prior to, or after, eluting the water-soluble polymer of ethylene oxide contained in the film. For impregnating the film with the foaming agent solution, suitable methods can be employed, such as soaking the film in the foaming agent solution, coating the surface of the film with the foaming agent solution using a suitable applicator or by spraying. Since the foaming agent solution has the capacity of penetration, it penetrates into the interior of the film from its surface.

For regulating the amount of foaming agent impregnated into the film and the speed and depth of impregnation, any of such following suitable methods can be employed; namely, the method of adjusting the time of contact of the film with the foaming agent solution, the method consisting of adjusting amount of the foaming agent applied or sprayed to the film, the method of suitably choosing the concentration and class of foaming agent to be used in the foaming agent solution, and the method in which the temperature of film or the foaming agent solution is adjusted.

Now, the foaming is carried out immediately after the foaming agent solution has penetrated to a suitable depth, but in case difficulty is experienced in carrying out this operation owing to the too fast penetration of the foaming agent solution, the penetration into the film of the foaming agent can be stopped by immersing the film in a liquid which is compatible with the solvent of the foaming agent solution but is not compatible with film. As this liquid, generally usable are such as water, methanol, ethanol and ether.

According to this invention, the film may be impregnated with the foaming agent solution immediately after mixing and kneading the thermoplastic resin and the water-soluble polymer of ethylene oxide and forming the mixture into a film, or after the film has been contacted with water and the water-soluble polymer of ethylene oxide contained therein has been eluted into the water. Since the film whose water-soluble polymer of ethylene oxide has been eluted into water contains minute voids extending from its surface to the interior, when a film such as this is impregnated with a foaming agent solution, the penetration of the foaming agent solution into the film interior can also be achieved through these minute voids. The penetration of the foaming agent must be held to a suitable depth however, since if the foaming agent solution is caused to penetrate too far into the film interior, this results in impairing the configuration of the film and becomes the cause of a decline in its strength.

Next, the foaming agent solution, which has been impregnated into the film to a suitable depth, is decomposed by heating the film. The foaming agent, upon becoming heated to a temperature above that at which it decomposes, thermally decomposes and generates a gas, which escapes to the outside of the film by breaking through the surface thereof. Thus, the surface of the film, after the escape of the gas therethrough, becomes covered with fine craterlike depressions to form a rough paperlike surface.

Further, if use has been made of a foaming agent solution consisting of a foaming agent dissolved or diluted with a solvent, better results are had when the solvent in the film is also made to escape along with the foaming agent when the latter is thermally decomposed.

In thermally decomposing the foaming agent that is impregnated in the film, any method may be suitably employed; namely, the method of heating by means of such as electricity, infrared rays or heated gas, or the method in which the foaming agent-impregnated film is immersed in a liquid of a temperature higher than that at which the foaming agent decomposes, or the method in which a liquid of such a temperature is blown against the film.

If hot water, a heated water-ethylene glycol azeotropic liquid, steam and the like are used in this invention for thermally decomposing the foaming agent, the elution of the water-soluble polymer of ethylene oxide contained in the film and the decomposition of the foaming agent impregnated in the film can be accomplished at the same time.

In those cases in which the foaming agent-impregnated film would shrink by heating to an elevated temperature as in the case of a stretched film, the decomposition temperature of the foaming agent can be lowered by adding a foaming assistant to the heating liquid. If, as this foaming assistant, a chemical such as an acid or alkali is added, the foaming agent can be decomposed chemically with practically no need for heat. On the other hand, if the invention film formed by mixing and kneading together a thermoplastic resin and a water-soluble polymer of ethylene oxide is applied the foaming agent solution before the film has cooled and hence still has a temperature higher than that at which the decomposition of the foaming agent to be used takes place, the thermal decomposition of the foaming agent can be made to occur practically simultaneously with the impregnation of the foaming agent solution to generate a gas which breaks through the surface of the film to effect the roughening of the film surface. Now, if the film is contacted with water, the surface in contact with the water becomes greater, since the film surface has been erupted by means of the gas generated by the thermal decomposition of the foaming agent, and as a result the elution of the water-soluble polymer of ethylene oxide contained in the film is facilitated. This method is effective in the case of those resins which are difficulty impregnated with solvents such as polyethylene, polypropylene, polyamides and polyacetal.

Further, according to this invention, after elution of the water-soluble polymer of ethylene oxide from the film obtained from a thermoplastic resin and a water-soluble polymer of ethylene oxide, the film may be contacted with an organic solvent which either dissolves or swells the film to cause the film to be impregnated with the organic solvent, following which the organic solvent contained is caused to escape.

For impregnating the film with the organic solvent, either the film may be immersed in the organic solvent or the organic solvent may be applied to the film surface with a suitable applicator.

The amount of organic solvent the film is impregnated with and the speed of penetration can be adjusted by varying the time of immersion of the film in the organic solvent and the immersion temperature, or by adding to the organic solvent a nonsolvent of the resin.

Next, the film impregnated with the organic solvent is immersed in a liquid which is compatible with the organic solvent but is not compatible with the thermoplastic resin which forms the film, whereupon the penetration of the organic solvent into the film is stopped and the organic solvent which has penetrated into the film is extracted therefrom. As this liquid which is compatible with the organic solvent but not compatible with the thermoplastic resin, usually usable are such as water, methanol and ethanol.

When in this invention the film from which has been eluted the water-soluble polymer of ethylene oxide is contacted with an organic solvent which either dissolves or swells the film, the organic solvent penetrates the film surface and minute voids. Now, when this organic solvent-impregnated film is contacted with a liquid which is compatible with the organic solvent but not compatible with the thermoplastic resin, and the organic solvent is extracted from the film, minute voids or wrinkles form on the film surface as a result of the extraction, and hence the surface of the film is roughened to a still greater degree to yield a film of a paperlike feel and good ink receptivity.

The sizing treatment or the various coating treatments that are practiced with the conventional pulp paper, such as treatments for preventing ink blotting, imparting surface glass, enhancement of smoothness and enhancement of strength, may be carried out on the thermoplastic film obtained by the invention method. For instance, the invention thermoplastic film can be treated with the following substances. For enhancing its strength, it can be treated with melamine, urea, phenolic resins, polyvinyl acetate, polyvinyl chloride, acrylic resins, polystyrene, butadiene-styrene copolymer, chlorobutadiene polymer, natural rubber, synthetic rubber, carboxymethyl cellulose, devil's tongue powder, viscose, etc. For imparting water repellency to the invention film, it can be treated with rosin size, paraffin wax, metallic soap, higher fatty acids, silicone resin, etc. For enhancing water proofness, polyvinyl chloride, vinylidene chloride resin, polystyrene, polyethylene, asphalt, paraffin wax, rubber chloride, etc., can be used. For improving its wettability usable are carboxymethyl cellulose, celluronic acid, viscose, devil's tongue powder, polyvinyl alcohol, synthetic rubber, etc. And for improving the finish of the film when printed, starch, casein, oil-soluble melamine resin, etc., can be used. These substances can be coated to the invention thermoplastic film by any of the various methods in either a state of a solution, emulsion or melt.

Further, there is no limitation whatsoever in practicing the secondary processing of laminating the thermoplastic film obtained by the invention method with the conventional plastic film, foam sheets, cellophane, nonwoven fabric, fabric, paper metals, wood leather, synthetic leather, glass, ceramics, etc., whereby the merits of the two materials which are laminated are made the best use of.

When the film composed of the thermoplastic resin and water-soluble polymer of ethylene oxide is partly eluted of its water-soluble polymer of ethylene oxide by contacting the film with water in this invention, a multicellular film having homogeneous minute voids opening from the interior to the surface of the film can be obtained.

It has been known to produce a multicellular film by using a solution consisting of a blend of a water-insoluble resin with a water-soluble resin and making this into a film by the method comprising flowing and spreading this solution and thereafter eluting the water-soluble resin into water. There is also known a method in which a thermoplastic resin is blended with a finely divided substance which is water-soluble but not thermoplastic and is not compatible with the thermoplastic resin, after which the components are melted in a state of dispersion which is as homogeneous as possible, and thereafter the film is formed from this melt, followed by elution of the water-soluble divided substance contained in the film into water, thereby obtaining a multicellular film. These methods are being employed in the manufacture of formal sponge, synthetic leather and vapor and moisture-permeable film.

However, in solution-blending a water-soluble resin with one which is water-insoluble, in most cases adjustment of the blend ratio cannot be carried out freely owing to the difference in the solubility in solvents of the individual resins. Hence, it is difficult to obtain a multicellular film of the type desired. Further, in order to obtain a film by the method of flowing and spreading out the solution, the multicellular film obtained becomes costly in view of the necessity for a solvent recovery step and equipment therefor, and hence its commercial value would be of not much worth.

On the other hand, in the case where the water-soluble substance is blended with the thermoplastic resin and a film is melt-molded therefrom, the water-soluble substance used, for example, such as the heretofore-known carboxymethyl cellulose, hydroxyethyl cellulose, carboxy- methylhydroxyethyl cellulose, methyl cellulose, polyvinyl alcohol, ethylhydroxyethyl cellulose, polyvinylpyrrolidon, sodium polyacrylate, sodium alginate, starch, glue, gelatin, gum arabic, sodium chloride, potassium bicarbonate and urea, are completely without or possess little, if any, thermoplaticity. Hence, even though they are melt-blended with thermoplastic resins they do not demonstrate a state of compatibility, and thus they differ in no way from the state in which an inorganic filler such as clay or talc has been mixed and kneaded with the thermoplastic resin. As a result, the state of dispersion of these water-soluble substances in the thermoplastic resin is nonuniform, their particle size is great and moveover there is a lack of continuity among the individual particles. Hence when these water soluble substances are eluted into water, excepting the water-soluble substance existing on the surface, the elution of those contained in the interior of the film is very difficult. And if a large amount of the water-soluble substances has been added, the elution thereof can be accomplished to a certain extent but the speed of elution is very slow, and hence it is not commercially feasible. In addition, the strength of the film declines to such a degree that it is not serviceable. Consequently, good multicellular films cannot be obtained by these methods.

In contradistinction, the water-soluble polymer of ethylene oxide, as used in this invention, excels in its affinity for the thermoplastic resins and moreover possess a high degree of thermoplasticity. Hence, when the foregoing water-soluble polymer is mixed and kneaded with a thermoplastic resin and formed into a film, the dispersion achieved differing from that of the previously mentioned known water-soluble substances, is highly homogeneous. And in addition, the dispersion of the invention water-soluble polymer of ethylene oxide can be caused to be present in the film in a suitably compatible as well as a netlike state possessing considerable continuity.

And since the water-soluble polymer of ethylene oxide maintains its continuity to a certain extent even inside the film and does not lose its water-solubility even into the interior of the film, the film, upon being contacted with water, elutes thereinto the water-soluble polymer of ethylene oxide it contains at a surprisingly fast rate to form a very minute multicellular structure extending from the surface layer of the film to its interior.

Thus since this very minute multicellular structure is very similar to that resulting from the interentanglement of fibers in the pulp paper, the thermoplastic film obtained by the invention method have graphic properties and a feel identical to that of paper and, as in case with paper, can be cut and folded. In addition, it also can be adhered and used for packaging purposes.

Further, when, in producing according this invention the film composed of a thermoplastic resin and a water-soluble polymer of ethylene oxide, the step of contacting the film with water and the step of impregnating the film with a foaming agent solution followed by decomposing the impregnated foaming agent or the step of impregnating the film with an organic solvent followed by contacting the film with a liquid which does not dissolve the film but which is compatible with the organic solvent to extract from the film the organic solvent are combined, roughness to a still greater extent is achieved on the film surface by the effect of the decomposition of the foaming agent or the liberation of the organic solvent. Thus a product can be obtained in which the surface gloss characteristic of plastics has been reduced and which excels in graphic properties and has a feel similar to paper.

The thermoplastic resin film obtained by the production method of this invention possesses hydrophilicity, since a part of the water-soluble polymer of ethylene oxide remains in the film and hence it is not easily charged with static electricity.

As the invention thermoplastic film is composed of thermoplastic resins, it excels not only in resistance to water and mechanical strength but in fastness to light as well. The possession of the outstanding characteristics such as hereinbefore described makes the invention thermoplastic film suitable for such graphic uses as newsprint, paper for publications other than newspaper, tracing paper, drafting and art paper, photographic printing paper, paper for maps and postal matters; as well as such uses as wrapping paper for merchandise and foodstuffs, as papers for building purposes such as wall and interior decorating uses and for lamp shades, a vapor-permeable and thermal insulation films for agricultural uses, and in addition, as adhesive tapes and labels.

For further illustrating the invention, the following examples are given. Unless otherwise indicated, parts in the examples are on a weight basis.

EXAMPLE 1

A composition consisting of 100 parts of polystyrene (Styrone GP–666, manufactured by Asahi Dow Company, Japan), 5 parts of polybutadiene (Diene Rubber NF 35 manufactured by Firestone Company) and 20 parts of polyethylene oxide (Polyox WSR 205 manufactured by Union Carbide Corporation) was kneaded for 10 minutes by means of a mixing roll with the temperature of the roll surface maintained at 150° C., cooled and pulverised. The pulverised product was then inflation moulded with the temperature of the die maintained at 180° C. to give a semi-transparent, milk-white film with a thickness of 5/100 mm.

When this film was immersed for 5 minutes in a hot water containing a small amount of a neutral detergent at about 80° C., a white opaque thermoplastic film was obtained. Microscopic examination of this film showed that its structure is a dense assembly of capillaries extending interiorly from the surface layer to the inner layer. A proportion of the polyethylene oxide which was dissolved into the water was 5% based on the weight of the polyethylene oxide used.

The behavior of this thermoplastic film towards bending, bending fixing, perforation, pile cutting, sizing, packaging, binding, printing and writing much resembles that of pulp paper. Its outer appearance and feel are too resembling those of pulp paper almost to distinguish it from pulp paper.

The molecular weight of the polyethylene oxide (Polyox WSR 205) used in this example was about 700,000.

EXAMPLE 2

A composition consisting of 100 parts of polystyrene (Styrone GP–666 manufactured by Asahi Dow Company), 5 parts of styrene-butadiene rubber (GRS 1502 manufactured by Nippon Gosei Gomu Kogyo Kabushiki Kaish), 20 parts of polyethylene oxide (Polyox WSR 205 manufactured by Union Carbide Corporation) and 20 parts of white carbon (Starsil SS manufactured by Kunoshima Kagaku Kogyo Kabushiki Kaisha, Japan) was mixed and melted for 10 minutes by means of a mixing roll with the surface temperature of the roll maintained at 150° C., cooled and pulverised. The pulverised product was inflation moulded with the temperature of the die maintained at 170° C. to make a film with a thickness of 8/100 mm.

The resulting film was immersed for one minute in a hot water containing a small amount of a neutral detergent at about 95° C. with the four sides fixed. There was obtained a white opaque thermoplasic film. Microscopic examination of this film did not reveal a structure of capillaries so densely assembled as in the thermoplastic film of Example 1 because of the presence of white carbon, but revealed a very fine porous structure having openings extending exteriorly. This structure, in conjunction with the white carbon uniformly dispersed therein, gives the film an excellent ability to absorb and fix water ink. The white carbon particles protrude on the surface of the film and make it coarse, and so the graphic property of the film is good.

A proportion of the polyethylene oxide which was dissolved into the water was about 7%.

The resulting thermoplastic film more resembles paper than obtained in Example 1. The values of physical properties are roughly the same as those obtained in Example 1.

EXAMPLE 3

The same composition as used in Example 2 was inflation moulded in the same manner to give a film with a thickness of 8/100 mm. The resulting film was coated with a solution of para-toluenesulfoazide (Cellmic L manufactured by Sankyo Kasei Kogyo Kabushiki Kaisha, Japan) obtained by dilution with 30 times its weight of methanol, and was immersed in a hot water containing a neutral detergent at about 95° C. with the four sides fixed. In 30 seconds, a white opaque thermoplastic film resulted.

Microscopic examination of this film showed that it has the same fine pore as in the film obtained in Example 2, and that crateriform holes with a diameter about 10 to even several hundred times larger than that of the fine pores are homogeneously dispersed on the surface of the film. As a result of printing, it was found that this film exhibits good ability of absorbing and fixing ink. In particular, this film had more excellent property to absorb, dry and fix water ink than the conventional pulp paper.

A proportion of polyethylene oxide which was dissolved in the water was 12%.

EXAMPLE 4

A composition consisting of 100 parts of impact-resistant polystyrene (Styrone HI–475 manufactured by Asahi Dow Company, Japan), 20 parts of polyethylene oxide (Polyox WSR 205 manufactured by Union Carbide Corporation), 20 parts of calcium carbonate (PC manufactured by Shiraishi Calcium Kogyo Kabushiki Kaisha, Japan), and 15 parts of clay (manufactured by Fuji Talc Kogyo Kabushiki Kaisha, Japan) were mixed at 150° C., and inflation moulded with the mold temperature maintained at 170° C. to make a film with a thickness of 7/100 mm. The resulting film was immersed in a hot water containing a neutral detergent at 95° C. for 1 minute with the four sides fixed. There was obtained a white opaque thermoplastic film. This film exhibits properties resembling those of pulp paper, and are excellent both in printability and graphic property. The physical properties of this film almost resemble those of the film obtained in Example 2.

A proportion of the polyethylene oxide which was dissolved into the water was about 7%.

EXAMPLE 5

The film obtained by inflation moulding of the same composition as that obtained in Example 4 was coated with a solution of benzenesulfoazide (manufactured by Sankyo Kasei Kogyo Kabushiki Kaisha, Japan) obtained by dilution with 35 times it weight of methanol, and then immersed for one minute in hot water at 95° C. with the four sides fixed. There was obtained a white opaque thermoplastic film. This film has a surface coarser than that of the film obtained in Example 4, and exhibits characteristics and graphic property closely resembling those of pulp paper.

A proportion of the polyethylene oxide was dissolved in the water was 12%.

EXAMPLE 6

Ten parts of polyethylene glycol (#4000 manufactured by Nippon Yushi Kogyo Kabushiki Kaisha, Japan) and 5 parts of polyethylene oxide (Polyox WSR 205 manufactured by Union Carbide Corporation) were mixed and melted at about 70° C. To this mixture were added 20 parts of calcium carbonate (PC manufactured by Shiraishi Kogyo Kabushiki Kaisha, Japan) and 100 parts of impact-resistant polystyrene (Styrone HI-475), and the mixing was effected at 150° C. for about 15 minutes. The obtained kneaded product was inflation moulded with the mold temperature maintained at 150° C. to give a film with a thickness of 5/100 mm.

The resulting film was immersed for 2 minutes in a hot water at 95° C. containing a neutral detergent with the four sides fixed. A white opaque thermoplastic film resulted. This film exhibits properties closely resembling those of pulp paper, and is excellent both in printability and graphic property. The physical properties of this film closely resemble those of the film obtained in Example 1. It is especially excellent in antistatic activity.

A proportion of the polyethylene oxide which was dissolved into the water at this time was about 4%.

EXAMPLE 7

The same composition as that of Example 2 was inflation moulded in the same manner as in Example 2 to give a film with a thickness of 8/100 mm.

This film was immersed in a solution of dimethyl formamide and water in a ratio of 2 to 1, and them immediately immersed in water. There was obtained a film having a white coarse surface onto which various finely divided powder is attached. The film is poor in absorption and drying of ink water, and exhibits feel and physical properties both giving an impression of plastic film. It is far from resembling pulp paper.

When this film was immersed for 1 minute in a hot water at 95° C. containing a neutral detergent with the four sides fixed, there was obtained a thermoplastic film having a porous structure which resembles pulp paper. This film is rich in printability and graphic property, but seems to be rather poor as compared with the film obtained in Example 3 except for use in photogravure printing.

A proportion of the polyethylene oxide which was dissolved into the water at this time was about 8%.

EXAMPLE 8

A composition consisting of 100 parts of impact-resistant polystyrene (Styrone HI-475 manufactured by Asahi Dow Company, Japan), 20 parts of an ethylene-vinyl acetate copolymer (Evaflex #150 manufactured by Mitsui Polychemical Company, Japan), 10 parts of polyethylene oxide (Polyox WSR 35 manufactured by Union Carbide Corporation) and 30 parts of clay (manufactured by Fuji Talc Kabushiki Kaisha, Japan) was inflation moulded in the same manner as in Example 1. The obtained film was coated with a solution of paratoluenesulfoazide obtained by dilution with 30 times its weight of methanol, and immersed for about 30 seconds in a hot water at 95° C. with the four sides fixed. There was obtained a white and opaque porous thermoplastic film having on its surface a uniform coarse structure. The resulting film has flexibility, and is superior to pulp paper in respect of both printability and graphic property.

The proportion of the polyethylene oxide which was dissolved into the water was 12%.

EXAMPLE 9

A composition consisting of 100 parts of impact-resistant polystyrene (Styrone HI-475), 10 parts of a phenoxy resin (PRD 8080 manufactured by Union Carbide Corporation), 5 parts of an ethylene-vinyl acetate copolymer (Evaflex #150 manufactured by Mitsui Polychemical Company, Japan), 2 parts of a styrenebutadiene rubber (GRS 1502 manufactured by Nippon Gosei Gomu Kogyo Kabushiki Kaisha, Japan), 5 parts of polyethylene oxide (Polyox WSR 35 manufactured by Union Carbide Corporation), 20 parts of clay (manufactured by Fuji Talc Kabushiki Kaisha, Japan), 10 parts of lithoponel (manufactured by Sakai Kagaku Kogyo Kabushiki Kaisha, Japan) was inflation moulded with the mold temperature maintained at 180° C. to get a milk-white film with a thickness of 8/100 mm.

When this film was immersed in a hot water at 95° C. for about 1 minute with the four sides fixed, a white opaque thermoplastic film with minute course surface was obtained. This film has printability and graphic property equivalent to those of pulp paper and is flexible. It has also a high tenacity (hard to break when it is crumpled) and is excellent in packaging property.

The proportion of the polyethylene oxide which was dissolved in the water was about 10%.

EXAMPLE 10

A composition consisting of 100 parts of polyvinyl chloride (Nikavinyl MF-800 manufactured by Nippon Carbide Kogyo Kabushiki Kaisha, Japan), 20 parts of a plasticiser (D.O.P. manufactured by Sekisui Kagaku Kogyo Kabushiki Kaisha, Japan), 30 parts of a stabiliser (Stann RC-71 maufactured by Sankyo Yuki Gosei Kabushiki Kaisha, Japan), 1 part of a stabiliser (BC-1000 J manufactured by Toa Rika Kogyo-Sho, Japan), 20 parts of polyethylene oxide (Polyox WSR 205 manufactured by Union Carbide Corporation) was kneaded for 10 minutes by means of a mixing roll with the temperature of the surface of the roll maintained at 150° C. The kneaded product was then rolled by a calendar provided with four inverse L-shaped rolls of 165° C., and finished by pressing. A semi-transparent, milk-white film with a thickness of 2/10 mm. resulted.

When this film was immersed in a warm water at about 80° C., it was completely made opaque in about 2 minutes and there was obtained a thermoplastic film having a very minute porous structure on its surface. The size of the pores was slightly smaller than those of styrene resin. This film is rich in flexibility, has high tensile strength and is excellent in printability, but is somewhat poor in graphic property.

The proportion of the polyethylene oxide which was dissolved in the water at this time was 5%.

EXAMPLE 11

A composition consisting of 100 parts of polyvinyl chloride (Nikavinyl MF-800 manufactured by Nippon Carbide Kogyo Kabushiki Kaisha), 20 parts of a plasticiser (D.O.P. manufactured by Seikisui Kagaku Kogyo Kabushiki Kaisha, Japan), 3 parts of a stabiliser (Stann RC-71 manufactured by Sankyo Yuki Gosei Kabushiki Kaisha, Japan), 1 part of a stabiliser (BC-1000 J manufactured by Toa Rika Kogyo-Sho, Japan), 20 parts of polyethylene oxide (Polyox WSR 205 manufactured by Union Carbide Corporation), 10 parts of calcium carbonate (T-3, manufactured by Shiraishi Calcium Kogyo Kabushiki Kaisha, Japan), and 5 parts of zinc sulphate (manufactured by Sakai Kagaku Kogyo Kubushiki Kaisha, Japan) was kneaded for 10 minutes by means of a mixing roll of 150° C., and then inflation moulded with the mold temperature of 180° C. There was obtained a white film with a thickness of 8/100 mm.

The obtained film, with the four sides fixed, was immersed for 2 minutes in a hot water of 95° C., containing a neutral detergent, dried, coated with a solution of tetrahydrofuran and dimethylformamide at a ratio of 1 to 1, and immediately thereafter immersed in water at room temperature. A white thermoplastic film having a porous structure was obtained.

This film has some gloss on the surface and exhibits properties closely resembling those of art paper. The physical properties of the film were almost the same as those obtained in Example 10.

The proportion of the polyethyleneoxide which was dissolved into the water at this time was about 7%.

EXAMPLE 12

The procedures of Example 11 were repeated except that a solution consisting of diethylazo dicarboxylate, tetrahydrofuran and methanol at a ratio of 1:3:6 was used instead of a solution of tetrahydrofuran and dimethyl formamide at a ratio of 1:1. There was obtained a white and opaque thermoplastic film, which was somewhat more excellent in graphic property than the film of Example 11.

The proportion of the polyethylene oxide which was dissolved into the water was about 8%.

EXAMPLE 13

The procedures of Example 11 were repeated except that 10 parts of a methyl methacrylate resin (Acrypet manufactured by Mitsubishi Rayon Kogyo Kabushiki Kaisha, Japan) was added to the composition of Example 11. The obtained thermoplastic film has a coarser surface than the film obtained in Example 11 and a higher rigidity. Its graphic property and printability are ufactured by Asahi Dow Company, Japan), 20 parts The proportion of the polyethylene oxide which was dissolved into the water at this time was about 10%.

EXAMPLE 14

Twenty parts of polystyrene (Styrone GP–666 manufactured by Asahi Dow Company, Japan), 20 parts of polyethylene oxide (Polyox WSR 205 manufactured by Union Carbide Corporation), 100 parts of polypropylene (Nobrene FG–3 manufactured by Mitsubishi Yuka Kabushiki Kaisha) and 10 parts of lithopone (manufactured by Sakai Kagaku Kabushiki Kaisha, Japan) were added in this order to a mixing holl heated to 180° C., kneaded for 15 minutes to make them into pellets. The pellets were then put into an extruder, and inflation moulded with the die temperature maintained at 195° C. There was obtained a white opaque film with a thickness of 10/100 mm.

The resulting film was immersed for 3 minutes in hot water at 95° C. to give a thermoplastic film having a very minute porous structure on the surface layer. The film is provided with printability, graphic property and rigidity, and has packaging property and bending property resembling those of pulp paper.

The proportion of the polyethylene oxide which was dissolved into the water at this time was as low as about 4%, and it was found that mainly the surface layer was dissolved.

EXAMPLE 15

A film obtained by inflation moulding of the same composition as that of Example 14 in the same manner as in Example 14 was coated with a solution of dinitrosopentamethylene tetramine (Cellmic A, manufactured by Sankyo Kasei Kogyo Kabushiki Kaisha, Japan) diluted with 10 times its weight of toluene, allowed to stand for about 3 minutes and then immersed for 2 minutes in hot water at 95° C. The resulting film has a fine coarse surface structure and is more excellent than that obtained in Example 14 in respect of graphic property.

The proportion of the polyethylene oxide which was dissolved into the water at this time was about 5%.

EXAMPLE 16

A composition consisting of 100 parts of polyethylene (Sholex 5008 X 80–150, manufactured by Showa Yuka Kabushiki Kaisha, Japan), 10 parts of impact-resistant polystyrene (Styrone–HI–475, manufactured by Asahi Dow Company, Japan), 20 parts of polyethylene oxide (Polyox WSR 205, manufactured by Union Carbide Corporation), 20 parts of lithopone (Sakai Kagaku Kogyo Kabushiki Kaisha) and 10 parts of calcium carbonate (T–3, manufactured by Shiraishi Calcium Kogyo Kabushiki Kaisha) was kneaded for 15 minutes by means of a mixing roll with the temperature of the roll surface maintained at 145 to 150° C. and made into pellets. The obtained pellets were then put into an extruder and inflation moulded with the mold temperature maintained at 150° C. to get a white opaque film with a thickness of 8/100 mm. The film was immersed for 3 minutes in hot water of 95° C. with the four sides fixed. There was obtained a porous thermoplastic film rich in flexibility. This film is somewhat low in graphic property but has printability equivalent to that of pulp paper. It is suitable for packaging.

The proportion of the polyethylene oxide which was dissolved in water at this time was about 5%.

EXAMPLE 17

The same composition as in Example 16 was inflation moulded in the same manner as in Example 16 to yield a film. The film was coated with a solution of paratoluenesulfoazide which was diluted with 5 times its weight of methanol and to which was added 3/10 time its weight of xylene. After 2 minutes later, the so treated film was immersed for 3 minutes in hot water of 95° C. to obtain a thermoplastic film. The resulting film has a coarser surface than that obtained in Example 16, has improved graphic property and allows rapid absorption and drying of printing ink.

The proportion of the polyethylene oxide which was dissolved into the water was about 6%.

EXAMPLE 18

A composition consisting of 100 parts of methylmethacrylic resin (Acrypet, manufactured by Mitsubishi Rayon Kabushiki Kaisha), 20 parts of polyethylene oxide (Polyox WSR 205, manufactured by Union Carbide Corporation) and 10 parts of clay (manufactured by Fuji Talc Kabushiki Kaisha) was kneaded by means of a mixing roll with a surface temperature of 185° C. for 10 minutes and made into pellets. The obtained pellets were then put into an extruder and inflation moulded with the mold temperature of 208° C. A semitransparent film with a thickness of 12/100 mm. was obtained. When this film was immersed for 5 minutes in warm water at 80° C., it was whitened and became a thermoplastic film having a porous structure on the surface. The film could be printed and written.

The obtained thermoplastic film was coated with a foaming agent solution of para-toluenesulfonyl hydrazide (Cellmic H, manufactured by Sankyo Kasei Kogyo Kabushiki Kaisha), methyl ethyl ketone and methanol in a proportion of 2:4:4 and left to stand in a hot air dryer at 80° C. for 2–3 seconds. The surface was rendered more coarse, and there was obtained a thermoplastic film excellent in graphic property and printability. The film is high in rigidity and lacks flexibility. It is, however, rich in light resistance and thermal resistance and can be suitably used as illumination cover.

EXAMPLE 19

A composition containing 100 parts of polyacetal (Juracon, manufactured by Polyplastics Corporation), 5 parts of impact-resistant polystyrene (Styrone HI–475, manufactured by Asahi Dow Company, Japan), 30 parts of polyethylene oxide (Polyox WSR 205, manufactured by Union Carbide Corporation), 10 parts of zinc sulphate (manufactured by Sakai Kagaku Kabushiki Kaisha) and 20 parts of calcium carbonate (T–3, manufactured by Shiraishi Calcium Kogyo Kabushiki Kaisha) was kneaded for 10 minutes by means of a mixing roll having a surface temperature of 165° C. and made into pellets.

The obtained pellets were then put into an extruder and inflation moulded with the mold temperature maintained at 180° C. to give a film with a thickness of 10/100 mm. The obtained film was immersed in hot water at 95° C. and the polyethylene oxide was dissolved out into the water. The resulting thermoplastic film was white and opaque and rich in flexibility and excellent in tear strength. It had printability and graphic property equivalent to those of pulp paper.

The proportion of the polyethylene oxide which was dissolved into the water at this time was 8%.

EXAMPLE 20

A composition consisting of 100 parts of polyamide (Amilan CM 4001, manufactured by Toyo Rayon Kabushiki Kaisha, Japan), 20 parts of impact-resistant polystyrene (Styrone HI–475, manufactured by Asahi Dow Company), 20 parts of clay (manufactured by Fuji Talc Kogyo Kabushiki Kaisha), and 10 parts of talc (SP Talc, manufactured by Nippon Talc Kogyo Kabushiki Kaisha) was extruded through a flat die with the mold temperature of 200° C. with the use of an extruder to give a film with a thickness of 10/100 mm. This film was immersed for 3 minutes in hot water of 95° C. After drying, the film was immersed in a solution of para-toluenesulfoazide, methanol and formic acid in a proportion of 3:5:4 maintained at a temperature of 50° C., and subsequently again immersed in hot water of 95° C. for 2 minutes. A white opaque thermoplastic film with a coarse surface was obtained. This thermoplastic film was superior in flexibility, thermal resistance and strength, and had printability and graphic property equivalent to those of pulp paper.

A proportion of the polyethylene oxide which was dissolved into the water at this time was about 8%.

EXAMPLE 21

A composition consisting of 100 parts of an ethylene-vinyl acetate copolymer (Evaflex 150 manufactured by Bitsui Polychemical Kabushiki Kaisha), 80 parts of impact-resistant polystyrene (Styrone HI–475 manufactured by Asahi Dow Company, Japan), 25 parts of polyethylene oxide (Polyox WSR 205 manufactured by Union Carbide Corporation), 40 parts of clay second grade (manufactured by Bihoku Funka Kogyo Kabushiki Kaisha, Japan) and 10 parts of talc (SP Talc manufactured by Nippon Talc Kogyo Kabushiki Kaisha) was kneaded for 10 minutes by means of a mixing roll of 150° C., and inflation moulded with the mould temperature maintained at 140° C. to give a film with a thickness of 8/100 mm.

The resulting film was immersed for 2 minutes in hot water at 95° C. with the four sides fixed. There was obtained a white opaque thermoplastic film. This film has a surface having a feel of fluff and is rich in flexibility.

The proportion of the polyethylene oxide which was dissolved into the water was about 10%.

EXAMPLE 22

A composition consisting of 100 parts of acrylonitrile-styreen copolymer (Tyril 783 manufactured by Asahi Dow Company), 3 parts of polyethylene oxide (Polyox WSR 205 manufactured by Union Carbide Corporation) and 10 parts of talc (SP Talc manufactured by Nippon Talc Kogyo Kabushiki Kaisha) was inflation moulded with the mould temperature of about 180° C. with the use of an extruder. A milk-white film resulted.

This film was immersed for about 2 minutes in hot water of 95° C. with the four sides fixed and a milk-white semi-transparent thermoplastic film was obtained. Subsequently, the film was further coated with a solution of para-toluenesulfoazide diluted with 10 times its weight of methanol on its surface, and again immersed in hot water of 95° C. for 1 minute with the four sides fixed. A thermoplastic film with a coarser surface was obtained. The resulting film is very excellent in graphic property and closely resembles the conventional tracing paper.

The proportion of the polyethylene oxide which was dissolved into the water was about 4%.

EXAMPLE 23

A composition consisting of 100 parts of methyl methacrylatestyrene copolymer (Diapet manufactured by Mitsubishi Rayon Kogyo Kabushiki Kaisha, Japan), 10 parts of polyethylene oxide (Polyox WSR 205 manufactured by Union Carbide Corporation) and 10 parts of talc (SP talc manufactured by Nippon Talc Kogyo Kabushiki Kaisha) was treated in quite the same manner as in Example 22 and a thermoplastic film was obtained. The resulting film exhibits physical properties almost the same as those of the film obtained in Example 22 except somewhat brittle nature and is similar to the tracing paper.

EXAMPLE 24

A composition consisting of 100 parts of poly-styrene (Styrone HI 475 manufactured by Asahi Dow Company, Japan), 100 parts of Styrobeads (manufactured by Sekisui Sponge Kogyo Kabushiki Kaisha, Japan), 0.7 part of Carplex (manufactured by Shionogi Seiyaku Kogyo Kabushiki Kaisha, Japan) and 30 parts of polyethylene oxide (Polyox WSR 205 manufactured by Union Carbide Corporation) was inflation moulded by an extruder with a barrel temperature of 70 to 120° C. A foamed film with a foaming ratio of about 6× and a thickness of 10/100 mm. was obtained.

This foamed film was immersed for 2 minutes in hot water of 95° C. with the four sides fixed to give a thermoplastic film. This film can be marked by pencil and has good printability.

The proportion of polyethylene oxide which was dissolved into the water at this time was 12%.

The Styrobeads used in this example are foamable styrol resin particles prepared by suspending styrol resin into water and impregnating it with propane, and have a propane content of about 6%.

EXAMPLE 25

The foamed film obtained in Example 24 was coated with a solution of para-toluenesulfoazide diluted with 30 times its weight of methanol before immersion in hot water, and immersed for 1 minute in hot water of 80° C. after drying of the methanol. A thermoplastic film with a coarse surface was obtained. This film has a more improved graphic property than the film obtained in Example 24 and can be used suitably in posters and calendars.

EXAMPLE 26

The same composition as in Example 8 was inflation moulded in the same manner as in Example 8 to get a film.

This film was passed successively through a solution of paratoluenesulfoazide diluted with 30 times its weight of methanol at a rate of 60 m./min., and then travelled in the air while drying the methanol. It was then passed for 2 minutes through hot water at 75° C. in which an alkylbenzene-type surfactant had been incorporated in an amount of 5 parts based on 100 parts of water, and again passed successively for 20 seconds through hot water of 95° C. containing the same surfactant as above mentioned while biaxially imparting tension, and taken up in a roll form. There was obtained a thermoplastic film resembling paper. The proportion of the polyethylene oxide which was dissolved in the water was 15%.

The following table shows the physical properties of the thermoplastic films having resemblance to paper, high quality printing paper and newsprint.

| | Measured physical properties; Measurement method; Unit | | | | | | | |
|---|---|---|---|---|---|---|---|---|
| | Density | Rupture strength | Tear strength | Tensile strength | | Bending strength | | Moisture permeability |
| | ASTM-D792A | JIS P-8112 | JIS P-8116 | JIS P-8113 | | JIS P-8115 | | JIS Z-0208 |
| | g./cm.$^3$ | kg./cm.$^2$ | kg./mm. | kg./mm.$^2$ | | Number of bending | | g./m.$^2$/24 hr. |
| Direction | | | | Longitudinal | Transverse | Longitudinal | Transverse | |
| Example 1 | 0.802 | 2.5 | 0.238 | 3.53 | 2.61 | >2,000 | >2,000 | 1,120 |
| Example 3 | 0.724 | 2.3 | 0.202 | 3.55 | 2.50 | >2,000 | >2,000 | 1,800 |
| Example 8 | 0.782 | 2.0 | 0.200 | 2.32 | 2.12 | >2,000 | >2,000 | 1,900 |
| Example 9 | 0.840 | 2.8 | 0.289 | 2.89 | 2.70 | >2,000 | >2,000 | 1,880 |
| Example 10 | 1.460 | 16.5 | 0.990 | 4.96 | 3.97 | >3,000 | >3,000 | 670 |
| Example 14 | 0.810 | 10.0 | 0.800 | 4.64 | 3.98 | >3,000 | >3,000 | 240 |
| Example 16 | 0.698 | 5.8 | 0.620 | 4.50 | 4.00 | >3,000 | >3,000 | 400 |
| Newsprint | 0.486 | 0.3 | 0.262 | 1.45 | 0.24 | 4 | 3 | 4,286 |
| High quality printing paper | 0.756 | 1.6 | 0.422 | 1.59 | 0.97 | 25 | 26 | 3,791 |

We claim:

1. A method of producing a paper-like thermoplastic film which comprises mixing and melt kneading together a thermoplastic resin selected from the group consisting of styrene resins, vinyl chloride resins, olefin resins, cellulose acetate resins, acrylic resins, polycarbonates, polyamides, polyacetals, thermoplastic polyesters, and polyvinyl butyrals, and a polyethylene oxide of the meander type having a molecular weight of above 100,000 followed by forming a film from said mixture under conditions of heat and pressure, contacting said film with water to elute thereinto a part of the polyethylene oxide, thereby providing the interior of the film with minute voids and at the same time providing the surface of the film with a fine roughness.

2. The method according to claim 1 wherein said thermoplastic resin is at least one member selected from the group consisting of polyvinyl chloride, interior plasticized vinyl chloride resins and vinyl chloride-vinyl acetate copolymer.

3. The method according to claim 1 wherein said thermoplastic resin is at least one member selected from the group consisting of polyethylene, polypropylene, polymer of 4-methylpentene-1, ethylene-vinyl chloride copolymer, ethylene-vinyl acetate copolymer and ethylene-propylene copolymer, and at least one member selected from the group consisting of polystyrene acrylonitrile-styrene copolymer, styrene-butadiene rubber, polybutadiene and acrylonitrile-butadiene-styrene copolymer.

4. The method according to claim 1 wherein said thermoplastic resin is at least one member selected from the group consisting of polyamides, polycarbonates and thermoplastic polyesters.

5. The method according to claim 1 wherein said thermoplastic resin is polyacetal.

6. A method of producing a paper-like thermoplastic film which comprises mixing and melt kneading together a thermoplastic resin selected from the group consisting of styrene resins, vinyl chloride resins, olefin resins, cellulose acetate resins, acrylic resins, polycarbonates, polyamides, polyacetals, thermoplastic polyesters, and polyvinyl butyrals, and a polyethylene oxide of the meander type having a molecular weight of above 100,000 followed by forming a film from said mixture under conditions of heat and pressure, contacting said film with water to elute thereinto a part of the polyethylene oxide, thereby providing the interior of the film with minute voids and at the same time providing the surface of the film with a fine roughness, then impregnating the film with a thermally decomposable foaming agent in the liquid state or a solution of a thermally decomposable foaming agent in a solvent and thereafter heating the film to decompose the impregnated foaming agent, thereby providing the surface of the film with a fine roughness to a still greater degree.

7. The method according to claim 6 wherein the foaming agent is at least one member selected from the group consisting of para-toluene-sulfoazide, benzene sulfoazide and diethyl azodicarboxylate.

8. A method of producing a paper-like thermoplastic film which comprises mixing and melt kneading together a thermoplastic resin selected from the group consisting of styrene resins, vinyl chloride resins, olefin resins, cellulose acetate resins, acrylic resins, polycarbonates, polyamides, polyacetals, thermoplastic polyesters, and polyvinyl butyrals, and a polyethylene oxide of the meander type having a molecular weight of above 100,000 followed by forming this mixture into a film under conditions of heat and pressure, impregnating said film with a thermally decomposable foaming agent in the liquid state or a solution of a thermally decomposable foaming agent in a solvent, then heating the film to decompose the impregnated foaming agent, thereby providing roughness in the surface of said film, and thereafter contacting the film with water to elute thereinto a part of the polyethylene oxide, thereby providing the interior of the film with a minute voids and at the same time the surface of the film with a fine roughness.

9. The method according to claim 8 wherein the foaming agent is at least one member selected from the group consisting of para-toluene-sulfoazide, benzene sulfoazide and diethyl azodicarboxylate.

10. A method of producing a paperlike thermoplastic film which comprises mixing and melt kneading together a thermoplastic resin selected from the group consisting of styrene resins, vinyl chloride resins, olefin resins, cellulose acetate resins,, acrylic resins, polycarbonates, polyamides, polyacetals, thermoplastic polyesters, and polyvinyl butyrals, and a polyethylene oxide of the meander type having a molecular weight of above 100,000 followed by forming this mixture into a film under conditions of heat and pressure, impregnating said film with a thermally decomposable foaming agent in the liquid state or a solution of a thermally decomposable foaming agent in a solvent and thereafter contacting the film with water of a temperature above the decomposition temperature of the foaming agent to decompose the foaming agent and at the same time to elute into the water a part of polyethylene oxide, thereby providing the interior of the film with minute voids and at the same time the surface of the film with fine roughness.

11. The method according to claim 10 wherein the foaming agent is at least one member selected from the group consisting of para-toluene-sulfoazide, benzene sulfoazide and diethyl azodicarboxylate.

12. A method of producing a paper-like thermoplastic film which comprises mixing and melt kneading together a thermoplastic resin selected from the group consisting of styrene resins, vinyl chloride resins, olefin resins, cellulose acetate resins, acrylic resins, polycarbonates, polyamides, polyacetals, thermoplastic polyesters, and polyvinyl butyrals and a polyethylene oxide of the meander type having a molecular weight of above 100,000 followed by forming this mixture into a film under conditions of heat and pressure, applying a thermally decomposable foaming agent in the liquid state or a solution of a thermally decomposable foaming agent in a solvent to the surface of said film, the temperature of the film at the time of application of said foaming agent being at least above the decomposition temperature of the foaming agent, and thereafter contacting the film with water to elute thereinto a part of the polyethylene oxide, thereby providing the interior of the film with minute voids and at the same time the surface of the film with a fine roughness.

13. The method according to claim 12 wherein the foaming agent is at least one member selected from the group consisting of para-toluene-sulfoazide, benzene sulfoazide and diethyl azodicarboxylate.

14. A method of producing a paper-like thermoplastic film which comprises mixing and melt kneading together a thermoplastic resin selected from the group consisting of styrene resins, vinyl chloride resins, olefin resins, cellulose acetate resins, acrylic resins, polycarbonates, polyamides, polyacetals, thermoplastic polyesters, and polyvinyl butyrals, and a polyethylene oxide of the meander type having a molecular weight of above 100,000 followed by forming this mixture into a film under conditions of heat and pressure, contacting said film with water to elute thereinto a part of the polyethylene oxide, thereby providing the interior of the film with minute voids and at the same time the surface of the film with a fine roughness, then contacting the film with an organic solvent which swells the film to impregnate said organic solvent thereinto, and thereafter contacting the film with a liquid which does not dissolve the thermoplastic film but which is compatible with said organic solvent to extract the latter from the film, thereby providing the surface of the film with a fine roughness to a still greater degree.

References Cited

UNITED STATES PATENTS

| | | | |
|---|---|---|---|
| 2,707,201 | 4/1955 | Fernald et al. | 264—49X |
| 2,894,289 | 7/1959 | Harper et al. | 264—49 |
| 3,190,765 | 6/1965 | Yuan | 264—49X |
| 3,262,625 | 7/1966 | Russell et al. | 264—45X |
| 3,316,217 | 4/1967 | Weissermel et al. | 260—67(FP) |
| 3,373,234 | 3/1968 | Schnizer et al. | 264—49 |
| 3,323,978 | 6/1967 | Rasmussen | 264—49UX |
| 3,365,353 | 1/1968 | Witman | 264—52X |
| 3,389,199 | 6/1968 | Bushnell et al. | 264—52X |

FOREIGN PATENTS

| | | | |
|---|---|---|---|
| 1,043,762 | 9/1966 | Great Britain | 264—49 |

PHILIP E. ANDERSON, Primary Examiner

U.S. Cl. X.R.

161—159, 164, 411; 260—2.5; 264—53, 54, 175, 176